July 7, 1936. J. O. LOGAN 2,046,830
UTILIZATION OF CHLORINE DIOXIDE
Filed Nov. 17, 1934
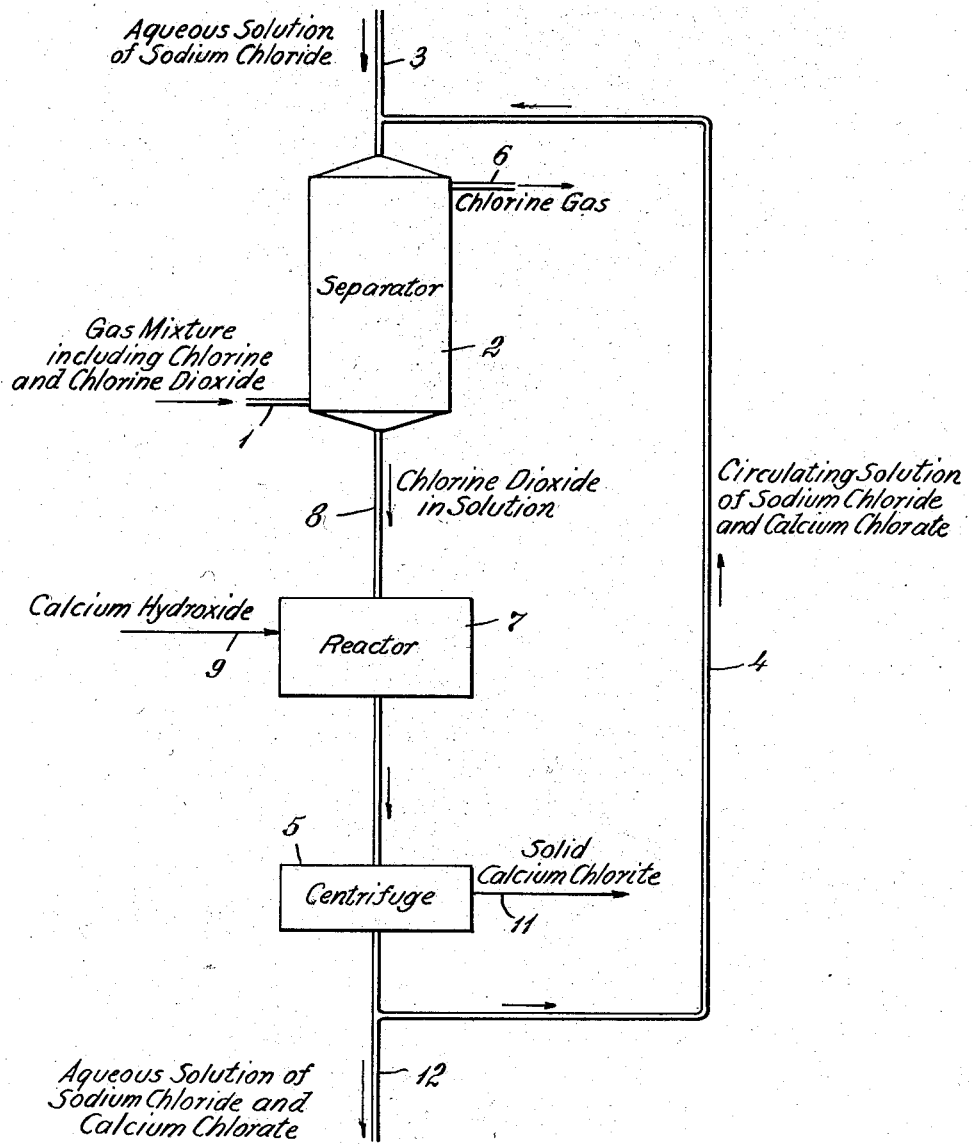
INVENTOR
John O. Logan
BY
Pennie, Davis, Marvin and Edmonds
ATTORNEYS Patented July 7, 1936

2,046,830

UNITED STATES PATENT OFFICE 2,046,830

UTILIZATION OF CHLORINE DIOXIDE

John Ogden Logan, Niagara Falls, N. Y., assignor to The Mathieson Alkali Works, Inc., New York, N. Y., a corporation of Virginia Application November 17, 1934, Serial No. 753,489

6 Claims. (Cl. 23—85)

This invention relates to improvements in the recovery of chlorine dioxide, primarily as calcium chlorite, $Ca(ClO_2)_2$, and secondarily as calcium chlorate, $Ca(ClO_3)_3$, from gas mixtures including chlorine as well as chlorine dioxide.

A method for separating chlorine dioxide from such gas mixtures by selectively dissolving it in aqueous media including saline aqueous media is described in an application filed August 15, 1934, Serial No. 739,888. The method there described involves recovery of the chlorine dioxide as such from the aqueous medium used to effect the selective separation.

The method of this invention involves selective solution of chlorine dioxide from such gas mixtures in saline aqueous media. It is characterized, however, by recovery of the chlorine dioxide from the aqueous medium used to effect the separation primarily as calcium chlorite and secondarily as calcium chlorate.

According to this invention, chlorine dioxide is separated from the initial gas mixture including chlorine and chlorine dioxide by selective absorption in an appropriate saline aqueous medium, the solution is then treated with sufficient calcium hydroxide to convert the dissolved chlorine dioxide to calcium chlorite and calcium chlorate, the calcium chlorite formed is precipitated from the solution by appropriate control of the saline concentration and the precipitated calcium chlorite is separated leaving a solution containing the calcium chlorate formed. Aqueous solutions of sodium chloride and of calcium chloride approximately saturated with respect to these salts, for example, and aqueous solutions of calcium chlorate short of saturation with respect to this salt by a margin sufficient to include the calcium chlorate formed, for example, are used with advantage to effect the separation of chlorine dioxide from the initial gas mixture in carrying out this invention. This step in the method of this invention may be carried out as described in the prior application above identified. The amount of calcium hydroxide required for reaction with the absorbed chlorine dioxide may be determined from the following type reaction:

$$4ClO_2 + 2Ca(OH)_2 = Ca(ClO_3)_2 + Ca(ClO_2)_2 + 2H_2O$$

The calcium chlorite formed is precipitated by the maintenance of a sufficient concentration of chloride, chlorate or chloride and chlorate while limiting the chlorate concentration to prevent chlorate precipitation. The concentration of any other salt used is, of course, also limited to prevent precipitation of contaminating salts with the calcium chlorite. The presence of sodium chloride, calcium chloride or calcium chlorate markedly diminishes the solubility of calcium chlorite. In a solution substantially saturated with respect to sodium chloride, the presence of calcium chlorate in proportion greater than about 55 grams per 100 cubic centimeters of water tends to involve precipitation of sodium chlorate.

The solution remaining after separation of precipitated calcium chlorite may be reused in the separation of chlorine dioxide from the initial gas mixture until the chlorate concentration reaches a point tending to involve precipitation of chlorate, sodium chlorate or calcium chlorate, for example, with the calcium chlorite, or, by appropriate control of the chlorate concentration of this solution, it may be used cyclically in the separation of chlorine dioxide from the initial gas mixture. Such control can be effected, for example, by regularly relieving the cycle of part of the chlorate solution. The calcium chlorate solution produced in carrying out this invention may be used, for example, in the generation of gas mixtures including chlorine and chlorine dioxide, or for the production of sodium chlorate.

The invention will be further illustrated by the following example of an operation embodying the invention:

A gas mixture including chlorine and chlorine dioxide, in amount containing 65 parts (by weight) of chlorine dioxide is scrubbed with a solution of 33 parts of sodium chloride in 100 parts of water at approximately 0° C. The resulting solution is reacted with about 36 parts of calcium hydroxide, sufficient to combine with the absorbed chlorine dioxide. Approximately 42.3 parts of calcium chlorite and 50 parts of calcium chlorate are formed, the bulk of the calcium chlorite precipitating from the solution. The precipitated calcium chlorite, about 93–97% of the total, is separated, by filtration or by centrifuging for example.

The accompanying drawing illustrates, as a flow diagram, an operation embodying the invention, such as that of the foregoing example. A gas mixture including chlorine and chlorine dioxide, supplied through connection 1, is scrubbed, countercurrently, in separator 2, with an aqueous solution of sodium chloride and calcium chlorate made up of a substantially saturated aqueous solution of sodium chloride supplied through connection 3 and a part, supplied through connection 4, of the aqueous solution of sodium chloride and calcium chlorate discharged from the centrifuge 5. The gas mixture remaining after solution of chlorine dioxide in the separator 2, and including the chlorine, is discharged through connection 6. The solution of chlorine dioxide flows from the separator 2 to the reactor 7 through connection 8, and is there treated with calcium hydroxide supplied as indicated at 9. The resulting slurry of calcium chlorite suspended in a solution of calcium chlorate and sodium chloride is discharged, through connection 10, to the centrifuge 5 from which separated solid calcium chlorite is discharged as indicated at 11. Part of the remaining solution of calcium chlorate and sodium chloride, sufficient to limit the concentration of chlorate to prevent precipitation of either calcium chlorate or sodium chlorate, is discharged through connection 12 and the balance is cycled to the separator 2 through connection 4. The rate at which the solution of sodium chloride is supplied through connection 3 is adjusted to compensate for the discharge of the solution of sodium chloride and calcium chlorate through connection 12.

By using an aqueous solution consisting essentially of calcium chlorate to effect the separation of chlorine dioxide from the initial gas mixture, several advantages may be attained. The solution remaining after separation of precipitated calcium chlorite then consists, essentially, of calcium chlorate, making possible the direct recovery of calcium chlorate by simple concentration and avoiding any necessity for handling solutions containing other salts such as sodium chloride or for effecting separations between calcium chlorate and other salts such as sodium chloride.

The calcium chlorite recovered in carrying out the invention can be washed in conventional manner and then dried, for example by air drying at low temperatures or by drying at moderate or elevated temperatures, in vacuo or at atmospheric pressure, to produce a satisfactory calcium chlorite product. Further to improve its purity, it may be recrystallized in conventional manner.

I claim:

1. In the utilization of chlorine dioxide from gas mixtures including chlorine as well as chlorine dioxide, the improvement which comprises separating chlorine dioxide from the gas mixture by selective absorption in a saline aqueous medium, treating the resulting solution with calcium hydroxide to convert dissolved chlorine dioxide to calcium chlorite and calcium chlorate, maintaining a saline concentration sufficient to precipitate calcium chlorite and separating the precipitated calcium chlorite.

2. In the utilization of chlorine dioxide from gas mixtures including chlorine as well as chlorine dioxide, the improvement which comprises separating chlorine dioxide from the gas mixture by selective absorption in an aqueous solution of sodium chloride, treating the resulting solution with calcium hydroxide to convert dissolved chlorine dioxide to calcium chlorite and calcium chlorate, maintaining a saline concentration sufficient to precipitate calcium chlorite and separating the precipitated calcium chlorite.

3. In the utilization of chlorine dioxide from gas mixtures including chlorine as well as chlorine dioxide, the improvement which comprises separating chlorine dioxide from the gas mixture by selective absorption in an aqueous solution of sodium chloride and calcium chlorate, treating the resulting solution with calcium hydroxide to convert dissolved chlorine dioxide to calcium chlorite and calcium chlorate, maintaining a saline concentration sufficient to precipitate calcium chlorite and separating the precipitated calcium chlorite.

4. In the utilization of chlorine dioxide from gas mixtures including chlorine as well as chlorine dioxide, the improvement which comprises separating chlorine dioxide from the gas mixture by selective absorption in an aqueous solution of calcium chlorate, treating the resulting solution with calcium hydroxide to convert dissolved chlorine dioxide to calcium chlorite and calcium chlorate, maintaining a saline concentration sufficient to precipitate calcium chlorite and separating the precipitated calcium chlorite.

5. In the utilization of chlorine dioxide from gas mixtures including chlorine as well as chlorine dioxide, the improvement which comprises separating chlorine dioxide from the gas mixture by selective absorption in an aqueous solution consisting essentially of calcium chlorate, treating the resulting solution with calcium hydroxide to convert dissolved chlorine dioxide to calcium chlorite and calcium chlorate, maintaining a saline concentration sufficient to precipitate calcium chlorite and separating the precipitated calcium chlorite.

6. In the utilization of chlorine dioxide from gas mixtures including chlorine as well as chlorine dioxide, the improvement which comprises separating chlorine dioxide from the gas mixture by selective absorption in an aqueous solution of calcium chloride, treating the resulting solution with calcium hydroxide to convert dissolved chlorine dioxide to calcium chlorite and calcium chlorate, maintaining a saline concentration sufficient to precipitate calcium chlorite and separating the precipitated calcium chlorite.

JOHN OGDEN LOGAN.